US010408705B1

(12) United States Patent
Feigenbaum et al.

(10) Patent No.: US 10,408,705 B1
(45) Date of Patent: Sep. 10, 2019

(54) SYSTEM AND METHOD FOR FOCAL-PLANE ANGULAR-SPATIAL ILLUMINATOR/DETECTOR (FASID) DESIGN FOR IMPROVED GRADED INDEX LENSES

(71) Applicant: Lawrence Livermore National Security, LLC, Livermore, CA (US)

(72) Inventors: Eyal Feigenbaum, Livermore, CA (US); Jeffrey D. Bude, Danville, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 15/850,401

(22) Filed: Dec. 21, 2017

(51) Int. Cl.
*G01B 9/00* (2006.01)
*G01M 11/02* (2006.01)

(52) U.S. Cl.
CPC .............................. *G01M 11/0257* (2013.01)

(58) Field of Classification Search
CPC ............ G03F 7/70641; G03F 7/70591; G03F 9/7026; G01M 11/0235; G01M 11/00; G01M 11/0242; G01M 11/025; G01N 21/958
USPC ................................. 356/124–127; 382/255
See application file for complete search history.

(56) References Cited

U.S. PATENT DOCUMENTS 6,486,942 B1 * 11/2002 Colbourne ......... G01M 11/0228
356/124
8,040,502 B2 * 10/2011 Thomas ............... G01N 21/958
356/237.2
2014/0211313 A1 * 7/2014 Dobschal ............ G02B 27/0075
359/569

OTHER PUBLICATIONS

Kundtz, N., and Smith, D. R. "Extreme-angle Broadband Metamaterial Lens." Nature Materials, vol. 9, No. 2, 2010, pp. 129-132.
Born, Max and Wolf, Emil. "Principals of Optics: Electromagnetic Theory of Propagation, Interference and Diffraction of Light." Pergamon, 6th Edition, 1980, pp. 146-149.

* cited by examiner

*Primary Examiner* — Hoa Pham
(74) *Attorney, Agent, or Firm* — Harness, Dickey & Pierce, PLC

(57) ABSTRACT

The present disclosure relates to a method for imaging an optical signal received by a graded index (GRIN) optical element to account for known variations in a graded index distribution of the GRIN optical element. The method may involve using a plurality of optical detector elements to receive optical rays received by the GRIN optical element at a plane, where the plane forms a part of the GRIN optical element or is downstream of the GRIN optical element relative to a direction of propagation of the optical rays. The optical rays are then traced to a plurality of additional specific locations on the plane based on the known variations in the graded index distribution of the GRIN optical element. A processor may be used to determine information on both an intensity and an angle of the received optical rays at each one of the plurality of specific locations on the plane of the GRIN optical element.

18 Claims, 4 Drawing Sheets

SYSTEM AND METHOD FOR FOCAL-PLANE ANGULAR-SPATIAL ILLUMINATOR/DETECTOR (FASID) DESIGN FOR IMPROVED GRADED INDEX LENSES

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to graded index (GRIN) optical elements, and more particularly to a system and method which enhances the performance of a graded index element (such as a lens) based on a geometric optics transformation of a received optical signal at some optical plane after the element (such as the focal plane of the lens).

BACKGROUND

The statements in this section merely provide background information related to the present disclosure and may not constitute prior art.

Optical lens based systems are the backbone for many commercial applications, e.g., imaging and directed illumination systems. At the heart of these systems is the lensing optical system. However, the optical performance of an optical lensing system is limited by fabrication capabilities. For example, the ability to image at once the sky hemisphere for astronomical applications, which require wide angle cameras (such as for virtual reality applications), or to project light from a planar emitter to the hemisphere or a selected area on the hemisphere for LIDAR (Light Detection and Ranging applications), are limited by lensing design and fabrication methods for manufacturing fish-eye lenses.

For a fish-eye lens that projects the hemi-sphere on the lower hemisphere of a Luneburg spherical lens, it was recently shown that the lens could be modified using transformation optics to project a sky hemi-sphere onto a plane (where a detector could be positioned at, for example). However, such a device requires a graded-index (GRIN) optics with large variations in index across the structure volume. This is problematic because present day fabrication processes for GRIN optics are limited in respect to the refractive index difference and spatial resolution, especially in the short wavelength range (i.e., near infra-red, visible, ultra-violet). Therefore, the performance of current technology implementation for the manufacture of GRIN optics prevents the use of such optics in important applications.

SUMMARY

In one aspect the present disclosure relates to a method for imaging an optical signal received by a graded index (GRIN) optical element to account for known variations in a graded index distribution of the GRIN optical element. The method may comprise using a plurality of optical detector elements to receive optical rays received by the GRIN optical element at specific locations on a plane, where the plane forms a part of GRIN optical element or is downstream of the GRIN optical element relative to a direction of propagation of the optical rays. The method may further involve tracing received optical rays to a plurality of additional specific locations on the plane based on the known variations in the graded index distribution of the GRIN optical element. A processor may be used to determine information on both an intensity and an angle of the received optical rays at each one of the plurality of specific locations on the plane.

In another aspect the present disclosure relates to a method for imaging an optical signal received by a graded index (GRIN) optical element to account for known variations in a graded index distribution of the GRIN optical element. The method may comprise using a plurality of optical detector elements to receive optical rays received by the GRIN optical element at a plane of the GRIN optical element. The method may further involve using ray tracing software to analyze received optical rays and to map the received optical rays to a plurality of different, specific locations on the plane of the GRIN optical element based on the known variations in the graded index distribution of the GRIN optical element. The method may further involve using a processor to calculate a distribution of both an intensity and an angle of the received optical rays at each one of the plurality of specific locations on the plane of the GRIN optical element. The method may further involve modifying at least one of the intensity and angle of the received optical rays, based on the calculated distribution of the intensity and angle of the received optical rays, to account for the known variations in the graded index distribution of the GRIN optical element.

In still another aspect the present disclosure relates to a method for imaging an optical signal received by a graded index (GRIN) optical element to account for known variations in a graded index distribution of the GRIN optical element. The method may comprise using a plurality of optical detector elements in the form of lenslets to receive optical rays received by the GRIN optical element at a plurality of locations on a focal plane of the GRIN optical element. The method may further involve mapping the received optical rays to a plurality of different, specific locations on the focal plane of the GRIN optical element based on the known variations in the graded index distribution of the GRIN optical element. The method may further involve using a processor to calculate a distribution of both an intensity and an angle of the received optical rays at each one of the plurality of specific locations on the focal plane of the GRIN optical element. Still further, the method may involve modifying both the intensity and angle of the received optical rays, based on the calculated distribution of the intensity and angle of the received optical rays, to account for the known variations in the graded index distribution of the GRIN optical element.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1A:
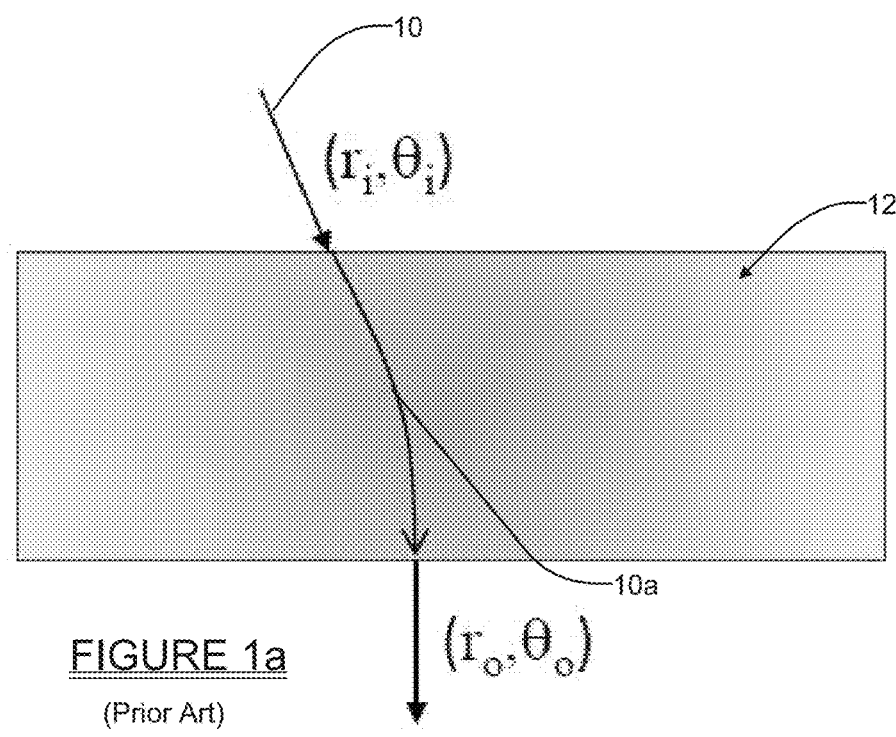
FIG. 1a illustrates a diagram showing how well known ray tracing software is able to project how a light ray is bent as the light ray travels through a GRIN optical element that is designed to function as a lens, where the refractive index distribution is known; where the light rays emanated by two different point sources at the night sky are assigned different reference numbers; and where the GRIN optical element which functions as a lens is focusing the different rays into different locations at its other end, which functions therefore as a focal plane.

The following description is merely exemplary in nature and is not intended to limit the present disclosure, application, or uses. It should be understood that throughout the drawings, corresponding reference numerals indicate like or corresponding parts and features.

The present disclosure involves a method and system that enhances the performance of an graded index (GRIN) optical element based on a geometric optics transformation of an optical signal at some designated point of the element, for example on a focal plane of the element. At a broad level, in one example the present disclosure involves measuring/manipulating the intensity and angle of the light spatially at the focal plane (i.e., output surface) of the optical element (for example the focal plane of a lens).

It will be appreciated that geometric optics principles rely on the light ray vector at each point at some determined location on, or relative to, an optical element. For the following discussion it will be assumed that the optical element is a lens, and the determined location is a focal plane of the lens. Thus, the geometric optics principles can be said to rely on the light ray vector at each point on the focal plane, namely, the location on the focal plane and the direction. Referring to FIG. 1a, a ray vector 10 is illustrated. Given the ray vector 10 at one location and the refractive index in space, represented by reference number 12, the ray trajectory 10a could be determined uniquely, such as illustrated in FIG. 1a. This operation may be easily accomplished with ray-tracing commercial software (e.g., Code V optical design software available from Synopsys of Mountain View, Calif., or optical design software available from Zemax LLC) or by hand-written codes.

Figure 1B:
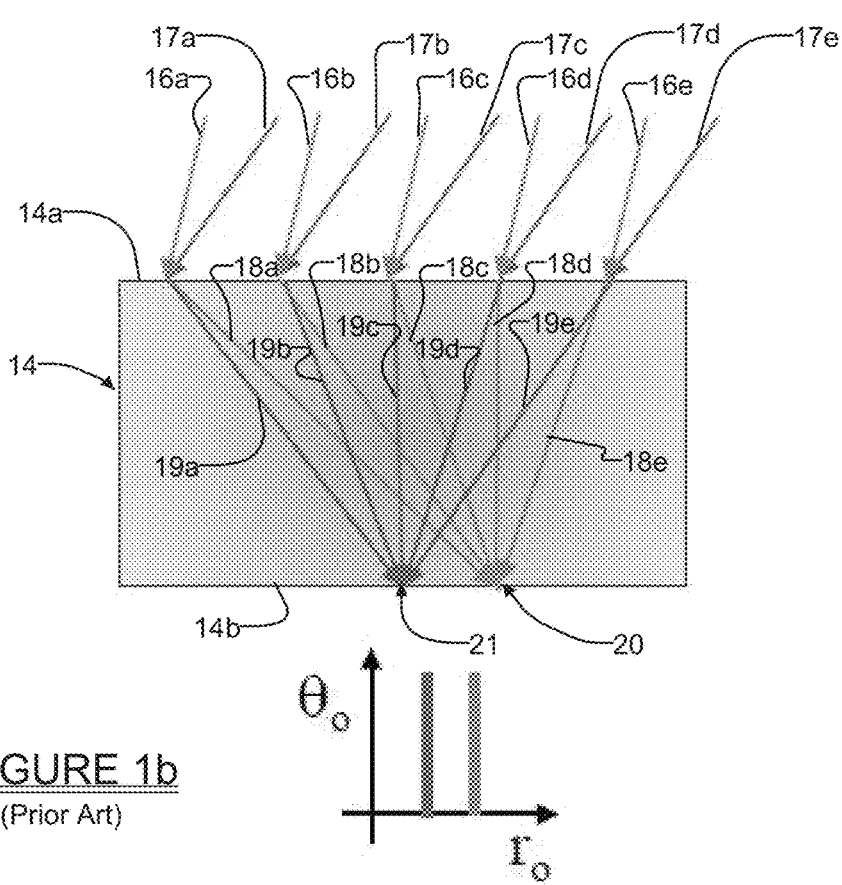
FIG. 1b shows how the paths of a plurality of light rays emanating from different sources in the sky, and passing through an input surface of a planar slab (e.g., planar lens) may be traced to specific locations on an output surface of the planar slab, where the slab has a known GRIN distribution, by using well known ray tracing software; for ideally implemented graded refractive index distribution, all the rays that arrives from a given direction (i.e., given point source in the night sky) are mapped uniquely onto the same location on the focal plane (i.e., output of the planar lens), which is represented in FIG. 1b on the output location—angle $(r_0-\theta_0)$ plane as a straight line normal to the $r_0$ plane.
Figure 1C:
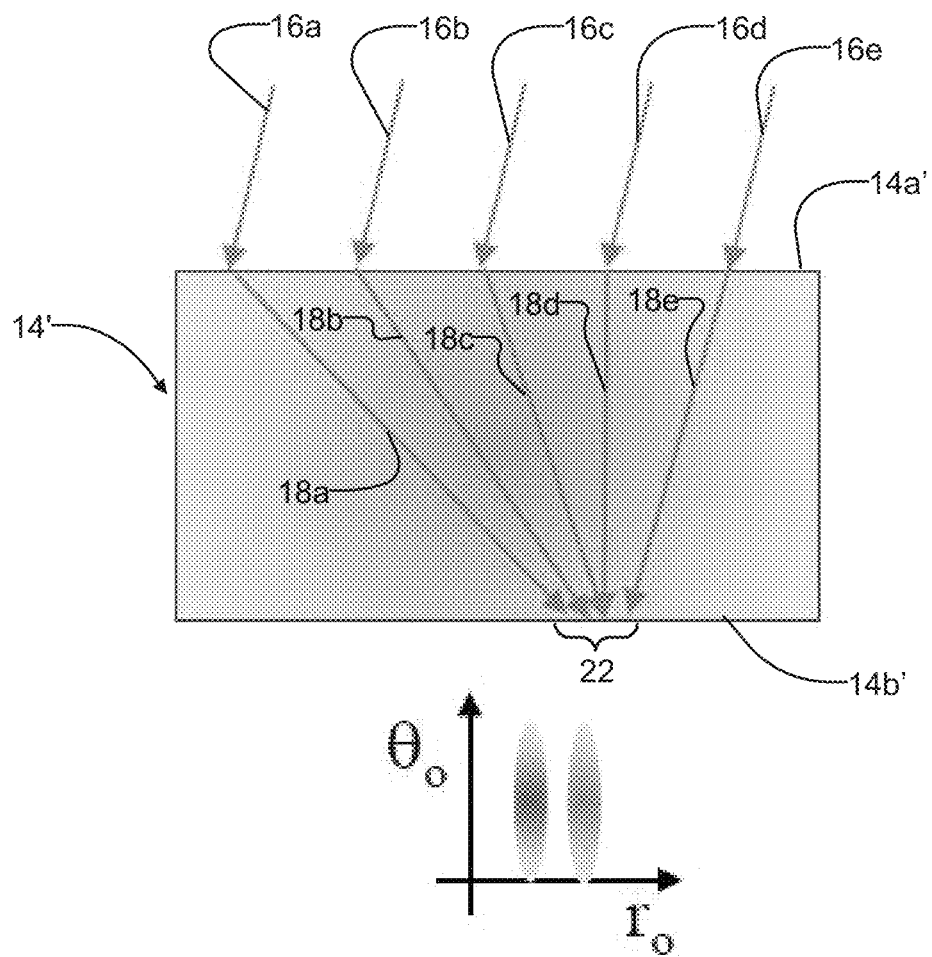
FIG. 1c shows a more accurate depiction of how in a real world, presently manufactured fish-eye lens, there will be an overlap of the light rays entering at different points on an input surface the fish-eye lens when the light rays reach the output surface (i.e., the light rays will not be perfectly focused at the same point on the output surface as would be the case with a perfectly manufactured fish-eye lens)

Referring to FIG. 1b, given an assumed GRIN distribution in a planar slab 14 functioning as an optical lens, the ray tracing software maps each input light (i.e., optical) ray 16a-16e emanating from the same point in space, which enter an input surface 14a of the planar slab 14, to a corresponding ray vector 18a-18e at an output surface 14b of the planar slab 14. Likewise, each light (i.e., optical) ray 17a-17e emanating from a different point in space is mapped to a different ray vector 19a-19e. For the planar slab 14 to function as an ideal fish-eye lens, for example, all the input rays 18a-18e at the given angle would need to map to one location 20 at the output surface 14b, distinct from other input angles, and all the input rays 19a-19b would likewise need to map to one location 21, which would be different from location 20 in this example because the rays 16a-16e and 17a-17e originate from different points in space. However, for a non-idealized fish-eye lens 14' as shown in FIG. 1c, which has an input surface 14a' and an output surface 14b', there will be an "overlap" on the output surface 14b' between these entrance angles for the rays 16a-18e. Put differently, the rays 16a-16e entering the input surface 14a' of the non-idealized fish-eye lens 14' will not be focused to the exact same spot on the focal plane (i.e., output surface) of the lens, but rather will be focused to different spots within a region 22 as shown by rays 18a-18e. Region 22 illustrates this overlap.

Figure 2:
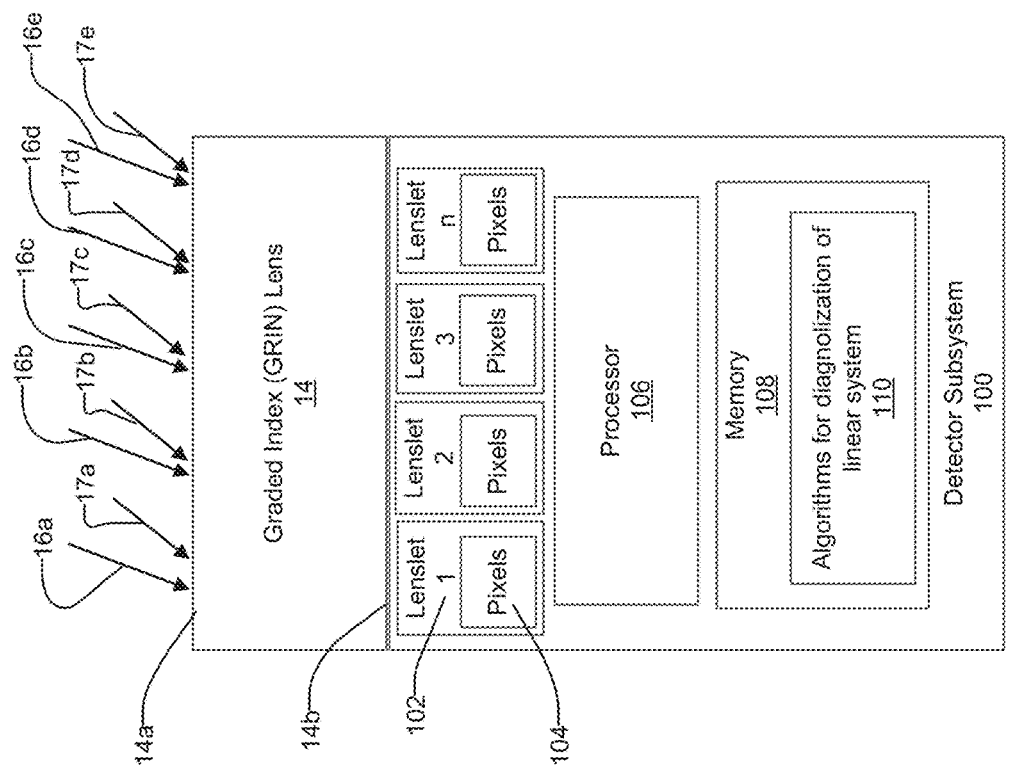
FIG. 2 is a high level block diagram of one embodiment of a detector system in accordance with the present disclosure for optimizing the performance of an imperfect graded index (GRIN) lens.

The system and method of the present disclosure will now be described with reference to a detector system 100 shown in FIG. 2. The system 100 enables detecting both the intensity and the angle of optical rays arriving at the output surface 14b of the GRIN lens 14, where the output surface 14b in this example is the focal plane. In this example the system 100 may make use of a plurality of optical detector elements, which in this example may be lenslets 102, which each cover a predetermined group of pixels 104 for detecting the presence of incoming rays 16 and 17. Typically hundreds, thousands or more of the lenslets 102 may be incorporated in the system 100, depending on how many pixels 104 are being used. The lenslets 102 are sufficient in number and arranged to preferably image the entire output surface 14b (i.e., the entire focal plane) of the GRIN lens 14. The system 100 also may include a processor 106 which receives signals from the lenslets 102 and which also communicates with a memory 108. The memory 108 may be a non-volatile memory that includes one or more algorithms 110 for carrying out the diagonalization of a linear system matrix using the information supplied from the lenslets 102.

As explained with reference to FIG. 1c, for the imperfect GRIN lens 14, when exciting the lens 14 with each of the different entrance angles for rays 16 and 17 on all of the input surface 14a (i.e., entrance) locations of the lens, this will result in a distinctive spatial-angular output distribution. Performing a correlation between the obtained distribution of entrance angles of the rays 16 and 17 entering the lens 14, and the distinctive pattern for each entrance angle, enables a maximal value to be obtained for each excitation angle of optical ray that excited the lens 14. For received light rays that produce multiple excitation angles (a result of multiple objects on the sky hemi-sphere), there will be multiple correlation maximum locations at the corresponding distribution matching the exciting angles, since the system 100 is a linear system. Put differently, for the example shown in FIG. 2, since there are rays entering the lens 14 at two distinct entrance angles (i.e., rays 16 and 17 shown entering the lens at different angles), this will produce two correlation maximum spatial locations on the lens output surface 14b: one for the rays 16 and another for the rays 17. This operation may be described mathematically as diagonalization of the linear system matrix, and the algorithms for diagonalization of the linear system matrix 110, stored in memory 108, are used by the processor 106 to carry out this diagonalization. As the lens 14 would be close to a perfect fish-eye lens, the overlap of the different input angle cases would be smaller, enabling better separation resolution over larger night sky angle. The GRIN lens refractive index distribution and the algorithm is then optimized to minimize the overlap of different input angles (i.e., minimize the $r_0$ width of the distribution in FIG. 1c). Optimization of the GRIN lens distribution and the transformation algorithm by the system 100, under the fabrication constraints of the optics and required specifications, is expected to result in improved performance of the lens 14 due to the additional degrees of freedom allowed in the construction of the lens. This principle, demonstrated here for a GRIN optical element that forms a GRIN optical lens (using the spatial-angular information at the focal plane), could be implemented to improve the performance of other GRIN optical elements constrained by fabrication limitations using the spatial-angular information at a plane after (i.e., downstream relative to the direction of the rays 16 and 17) the element (e.g., spectroscopic gratings).

As noted above, the detector system 100 is able to record the angular distribution of light rays (which includes both angle and intensity) that are received by the lens 14 at a large plurality of locations on the output surface 14b of the lens, and more preferably at every location on the output surface (i.e., focal plane) of the lens 14. The group of light rays that arrive at a specific lenslet 102 location is separated by the different pixels associated with that particular lenslet, according to the arriving directions (i.e., arriving angles of each light ray imaged by each pixel). Therefore, the intensity at a specific focal plane location (i.e., specific location on the output surface 14b) is the sum of all the rays arriving at that particular lenslet 102, and the angular distribution is determined by the sub-pixel location for this lenslet. The ratio between the focal length of the lenslet 102 and the spatial deviation from the lenslet center gives the angle of the incoming ray(s) received at a given lenslet 102.

Figure 3:
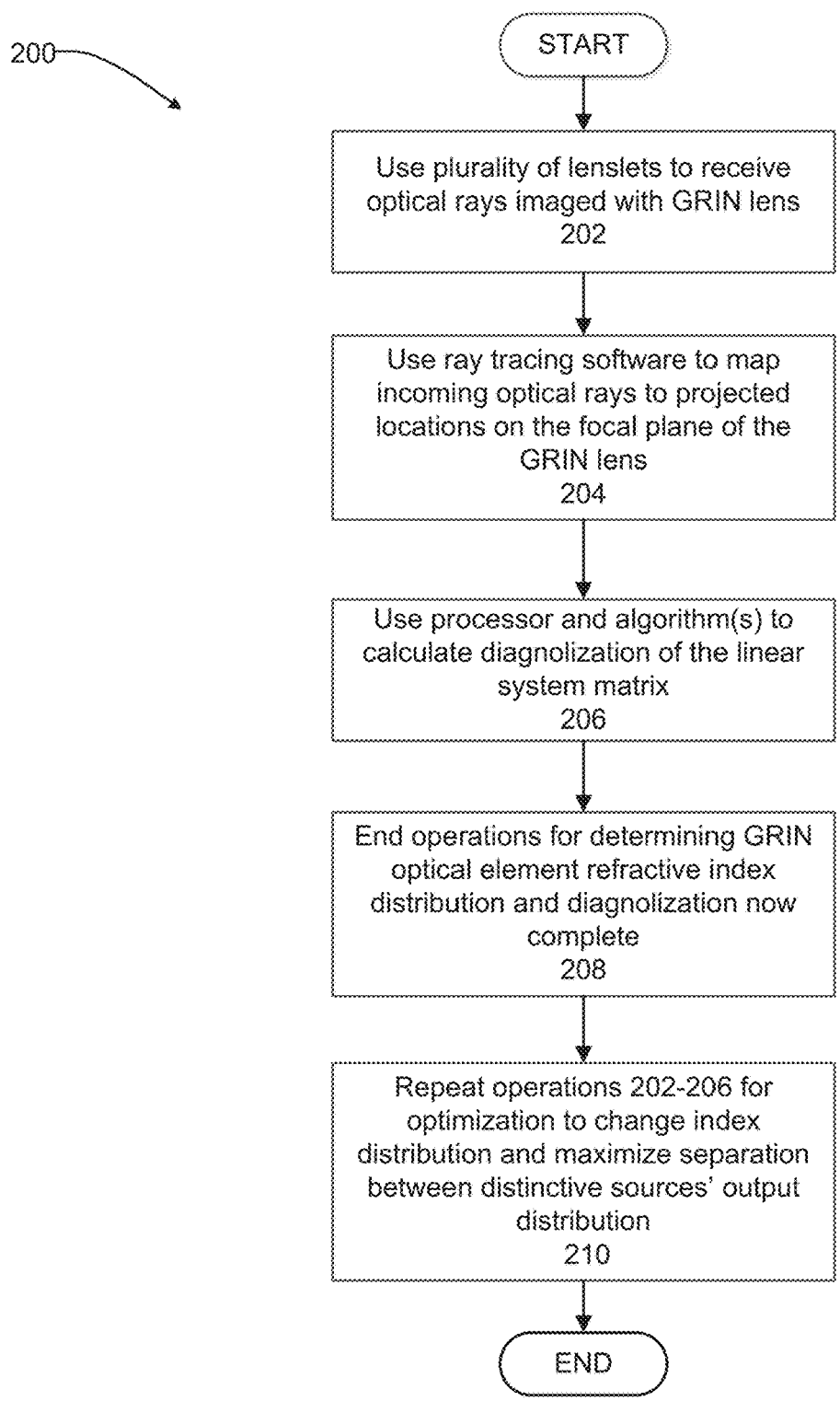
FIG. 3 is a high level flowchart illustrating major operations performed by the system of FIG. 2 in determining both the spatial and intensity distribution of received optical rays on the focal plane of the GRIN lens.

Referring to FIG. 3, a high level flowchart 200 is shown illustrating major operations performed in carrying out the methodology of the present disclosure. At operation 202 the lenslets 102 are used to receive the optical rays 16 and 17 being imaged by the GRIN lens 14. At operation 204, suitable ray tracing software may be used to map incoming optical rays 166 and 17 to specific locations on the output surface 14b (i.e., focal plane) of the GIN lens 14. At operation 206 the processor 106 applies the algorithm(s) 108 to calculate the diagonalization of the linear system matrix to predict the sources (i.e., point sources at the night sky) that resulted in the detected spatial-angular distribution on the detector. At operation 208, the operations for determining the GRIN optical element refractive index distribution and diagonalization are now complete, and such operations may be concluded. Based on the process described from "Start" to operation 206 (being the output) for a GRIN optical element with different refractive index distribution, an optimization step, as indicated by operation 210 may then be executed which changes the index distribution and seeks to maximize the separation between distinctive sources' output distributions.

The methodology disclosed herein also holds for other imaging systems and also to illumination systems. For an illumination system, the system 100 may be modified to determine the focal plane illuminator profile, and combine requirements from the GRIN optics and the location and angle distribution of the source optical signal in order to generate an optical signal having a desired spatial/intensity profile. A spatial control of the angle(s) of optical signals projected could also be achieved with micro-MEMS system, for example. A similar approach for optimizing the fabrication-limited function of the GRIN lens may use additional degrees of freedom (e.g., emitters' locations, brightnesses and GRIN lens index) for tailoring specialized irradiation patterns.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for imaging an optical signal received by a graded index (GRIN) optical element to account for known variations in a graded index distribution of the GRIN optical element, the method comprising:
   using a plurality of optical detector elements to receive optical rays received by the GRIN optical element at specific locations on a plane, where the plane forms a part of GRIN optical element or is downstream of the GRIN optical element relative to a direction of propagation of the optical rays;
   tracing received optical rays to a plurality of additional specific locations on the plane based on the known variations in the graded index distribution of the GRIN optical element; and
   using a processor to determine information on both an intensity and an angle of the received optical rays at each one of the plurality of specific locations on the plane.

2. The method of claim 1, further comprising using the information on both the intensity and the angle of received optical rays at each one of the plurality of specific locations on the plane to generate a correction for at least one of the angle and intensity to account for the variation in the graded index of the GRIN optical element.

3. The method of claim 1, wherein using the plurality of optical detector elements comprises using a plurality of lenslets.

4. The method of claim 3, wherein using a plurality of lenslets comprises using a plurality of lenslets sufficient in number and arranged to cover an entire area of the plane.

5. The method of claim 3, wherein using the plurality of lenslets comprises using each one of the plurality of lenslets to receive signals from a plurality of associated pixels.

6. The method of claim 1, wherein using a processor to determine information on both an intensity and an angle of the received optical rays comprises using the processor to run an algorithm for calculating a diagonalization of a linear system matrix using the information.

7. The method of claim 1, wherein tracing received optical rays to specific locations on the focal plane of the GRIN optical element comprises using optical ray tracing software to map optical rays received at an input surface of the GRIN optical element to a focal plane of the GRIN optical element.

8. The method of claim 1, wherein using a plurality of optical detector elements to receive optical rays received by the GRIN optical element comprises using a plurality of optical detector elements to receive optical rays received by a GRIN optical element.

9. A method for imaging an optical signal received by a graded index (GRIN) optical element to account for known variations in a graded index distribution of the GRIN optical element, the method comprising:
   using a plurality of optical detector elements to receive optical rays received by the GRIN optical element at a plane of the GRIN optical element;
   using ray tracing software to analyze received optical rays and to map the received optical rays to a plurality of different, specific locations on the plane of the GRIN optical element based on the known variations in the graded index distribution of the GRIN optical element;
   using a processor to calculate a distribution of both an intensity and an angle of the received optical rays at each one of the plurality of specific locations on the plane of the GRIN optical element; and
   modifying at least one of the intensity and angle of the received optical rays, based on the calculated distribution of the intensity and angle of the received optical rays, to account for the known variations in the graded index distribution of the GRIN optical element.

10. The method of claim 9, wherein using a plurality of optical detector elements comprises using a plurality of lenslets.

11. The method of claim 10, wherein using a plurality of lenslets comprises using a plurality of lenslets sufficient in number to cover an entire area of the plane of the GRIN optical element.

12. The method of claim 10, wherein using a plurality of lenslets comprises using a plurality of lenslets each being associated with an associated plurality of pixels, and wherein the pixels associated with each said lenslet receive the optical rays at the focal plane of the GRIN optical element.

13. The method of claim 10, wherein using a plurality of lenslets comprises using a plurality of lenslets sufficient in number to cover an entire area of a focal plane of the GRIN optical element.

14. The method of claim 13, wherein covering an entire area of a focal plane of the GRIN optical element comprises covering an entire area of a GRIN lens.

15. A method for imaging an optical signal received by a graded index (GRIN) optical element to account for known variations in a graded index distribution of the GRIN optical element, the method comprising:
   using a plurality of optical detector elements in the form of lenslets to receive optical rays received by the GRIN optical element at a plurality of locations on a focal plane of the GRIN optical element;
   mapping the received optical rays to a plurality of different, specific locations on the focal plane of the GRIN optical element based on the known variations in the graded index distribution of the GRIN optical element;
   using a processor to calculate a distribution of both an intensity and an angle of the received optical rays at each one of the plurality of specific locations on the focal plane of the GRIN optical element; and
   modifying both the intensity and angle of the received optical rays, based on the calculated distribution of the intensity and angle of the received optical rays, to account for the known variations in the graded index distribution of the GRIN optical element.

16. The method of claim 15, wherein mapping the received optical rays comprises using ray tracing software to map the optical rays.

17. The method of claim 15, wherein using a plurality of optical detector elements in the form of lenslets comprises using a plurality of lenslets sufficient in number to image an entire focal plane of the GRIN optical element, and where the GRIN optical element forms a GRIN lens.

18. The method of claim 17, wherein each said lenslet is associated with a plurality of pixels, and wherein the pixels receive the optical rays.

* * * * *